United States Patent
Kumagai et al.

(10) Patent No.: US 6,977,759 B2
(45) Date of Patent: Dec. 20, 2005

(54) OPTICAL IMAGE READER

(75) Inventors: Toshimitsu Kumagai, Kawasaki (JP); Hiroyuki Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1048 days.

(21) Appl. No.: 09/741,019

(22) Filed: Dec. 21, 2000

(65) Prior Publication Data

US 2001/0035984 A1 Nov. 1, 2001

(30) Foreign Application Priority Data

Apr. 27, 2000 (JP) .................................... 2000-128519

(51) Int. Cl.⁷ ................................................. H04N 1/40
(52) U.S. Cl. ..................... 358/471; 358/474; 358/498; 358/296; 358/464; 358/537; 250/234; 271/117
(58) Field of Search ...................... 358/471, 1.9, 498, 358/464, 296, 446, 447, 443, 496, 444, 537; 250/234; 271/117

(56) References Cited

U.S. PATENT DOCUMENTS 4,199,784 A * 4/1980 Wellendorf et al. ......... 358/296
5,559,612 A   9/1996 Kanemitsu
5,790,211 A   8/1998 Seachman et al.
6,122,441 A * 9/2000 Tsuji ........................... 358/1.9

FOREIGN PATENT DOCUMENTS

| JP | 7-140433  | 6/1995  |
| JP | 9-83745   | 3/1997  |
| JP | 10-186538 | 7/1998  |
| JP | 11-298694 | 10/1998 |
| JP | 11-215312 | 8/1999  |

* cited by examiner

*Primary Examiner*—Edward Coles
*Assistant Examiner*—Heather D Gibbs
(74) *Attorney, Agent, or Firm*—Westerman, Hattori, Daniels & Adrian, LLP (57) ABSTRACT

Optical image reading equipment is disclosed, whereby a background color of a document can be changed depending on a processing of the acquired image. The equipment is provided with an illuminating member (32) for illuminating a document, a reading portion (30) for reading reflected light of the document, and a backing member provided at least in the reading position of the document. The backing member is disposed on the opposite side to the reading portion across the document. The backing member is configured by a member which produces background color outside the document changeable by means of electric control. Thus an image suitable for a successive processing can be output.

10 Claims, 9 Drawing Sheets

OPTICAL IMAGE READER

BACKGROUND OF THE INVENTION

1. Field of the Invention

The present invention relates generally to an optical image reader and more particularly to an optical image reader whereby a background color outside a document sheet can be changed.

2. Description of the Related Art

Optical image reading equipment is used as computer peripheral equipment to read by optical means two-dimensional image of a document. An image thus obtained is input to a computer for further processing. In recent years, various kinds of computer image processing have been developed. It is desired to obtain an image suitable for individual image processing.

Figure 12:
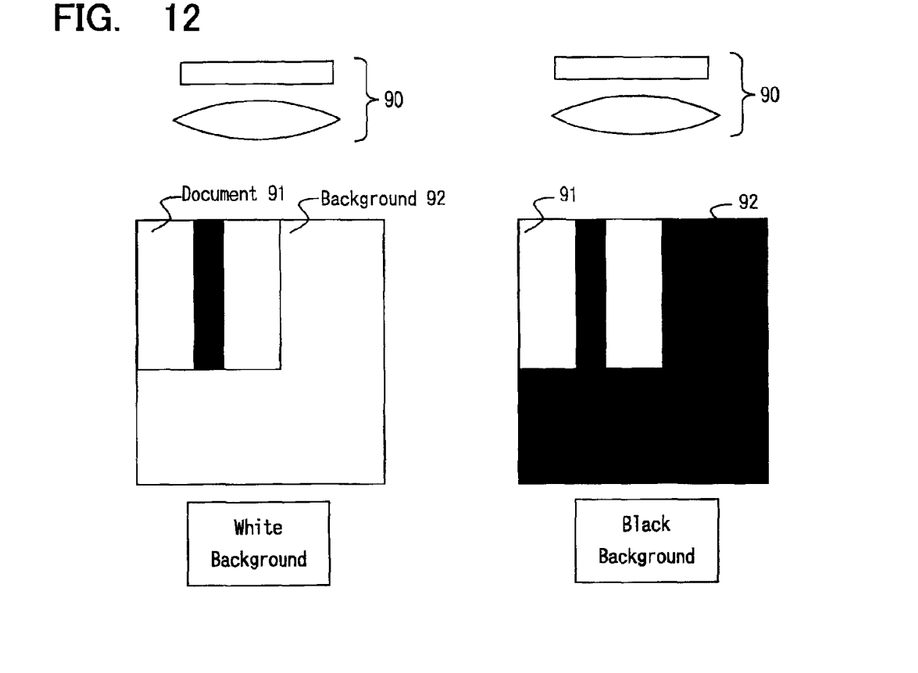
FIG. 12 shows a conventional art.
Figure 13:
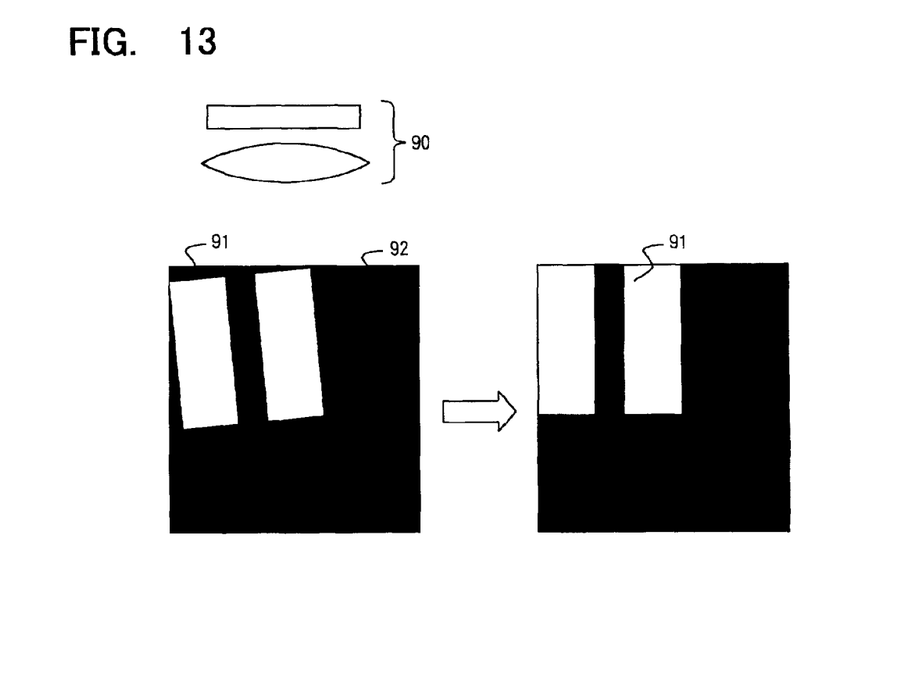
FIG. 13 is an operation diagram of the conventional art.

In FIGS. 12 and 13, a conventional method is illustrated. As shown in FIG. 12, optical image reading equipment produces an image of a document 91 by detecting light reflected by document 91. A reading portion 90 having a light detection element (e.g. CCD) is provided to detect reflected light.

In reading portion 90, the reflected lights in an entire reading area, which is irrespective of the document size, are converted to electric signals to output an image data. The obtained image data, therefore, contains an image of document 91 as well as a background part 92 positioned outside document 91.

Now, when the image is processed in a recognition processing such as OCR (optical character recognition), a significant image such as image of characters in document 91 can easily be extracted if the color of background part 92 is the same as the texture color of document 91. For example, when reading document 91 having white texture as shown in FIG. 12, black color characters in document 91 can easily be recognized if background part 92 is white.

On the other hand, in case of image filing processing etc., images in entire part of document 91 must be extracted. Also as shown in FIG. 13, when document 91 is obliquely placed on a platen, the oblique movement must be corrected electronically. In such cases as extracting whole images of document 91, it is preferable that the color of background part 92 is different from the texture color inside document 91. As shown in FIGS. 12 and 13, image of document 91 having white texture can easily be extracted if background part 92 outside document 91 is black.

The above-mentioned color of background part is determined by a color of a backing member provided in the reading position. Such backing member is fixed in position in case of either a sheet-feed type image scanner, where an image is read while a sheet is transported in the sub-scanning direction, or image reading equipment having optical system provided in a fixed position for reading a sheet on a platen.

For the above reason, in order to obtain proper images, it is required to use different image reading equipment depending on the situation: image reading equipment having a white backing member to obtain images for a recognition processing such as OCR, or image reading equipment having a black backing member for an image processing.

In the conventional method, it is difficult to configure image reading equipment having different backing member into one equipment. Accordingly, it is difficult to use the same equipment both for recognition processing and for image filing processing. In short, two different sets of image reading equipment are required to perform both processing described above.

In addition, recently various software systems have been developed. A single personal computer which has been introduced to conduct a processing by a software can be used for another processing simply by installing another software. A problem arises if image reading equipment which has been purchased for a processing can not be used for another processing, requiring another image reading equipment to be newly purchased.

SUMMARY OF THE INVENTION

It is an object of the present invention to provide optical image reader which enables to change color of the background part corresponding to the purpose of the image acquisition.

It is another object of the present invention to provide optical image reader which produces variable background color with a simple structure.

It is still another object of the present invention to provide single optical image reader for outputting images suitable for the types of processing.

To achieve above objects, an optical image reader according to the present invention comprises: an illuminating member for illuminating a document, a reading portion for reading reflected light of the document, a backing member provided at least in the reading position of said document and disposed on the opposite side to said reading portion across the document and for changing the background color outside the document by electric control.

According to the present invention, the backing member consists of a member of which background color can be changed by electric control means. This enables to output an image suitable for each image processing by changing background color electrically even in case the backing member is secured to the equipment. In addition, electric control provides easiness to change background color whenever it is necessary.

Another aspect of the optical image reader of the invention is that the backing member consists of electro-optic material having variable reflectivity, which easily enables to change background color.

In further aspect of present invention, the backing member is configured by liquid crystal member having variable light transmittance and reflective body. Using liquid crystal member available at low cost enables to realize low cost equipment as well as prevent the equipment from becoming large in size.

As yet another aspect of the optical image reader according to the present invention, a controller is provided for controlling by electric means reflectivity of the electro-optic member which enables easy change of background color.

Furthermore, the controller in the image reader of the present invention controls reflectivity of the electro-optic member by electric control means corresponding to a program read in to process the image. Accordingly, a desired image for executing image processing program can be output automatically.

The image reader in accordance with the present invention is provided with a sheet feeder for transporting the document. This type of equipment requires a small backing member which enables to maintain low equipment cost.

Further scopes and features of the present invention will become more apparent by the following description of the embodiments with the accompanied drawings.

DETAILED DESCRIPTION OF THE PREFERRED EMBODIMENTS

In the description of the preferred embodiments of the present invention, the embodiments of image reader, reading mechanism and controller are independently explained hereinafter, together with other embodiments.

[Image Reader]

Figure 1:
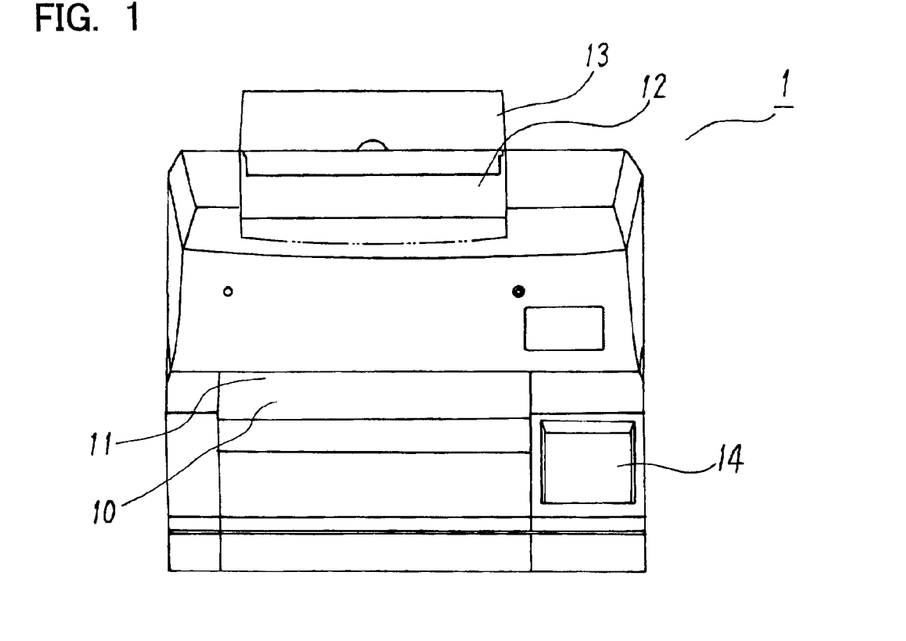
FIG. 1 is a front view of image reader according to an embodiment of the present invention.
Figure 2:
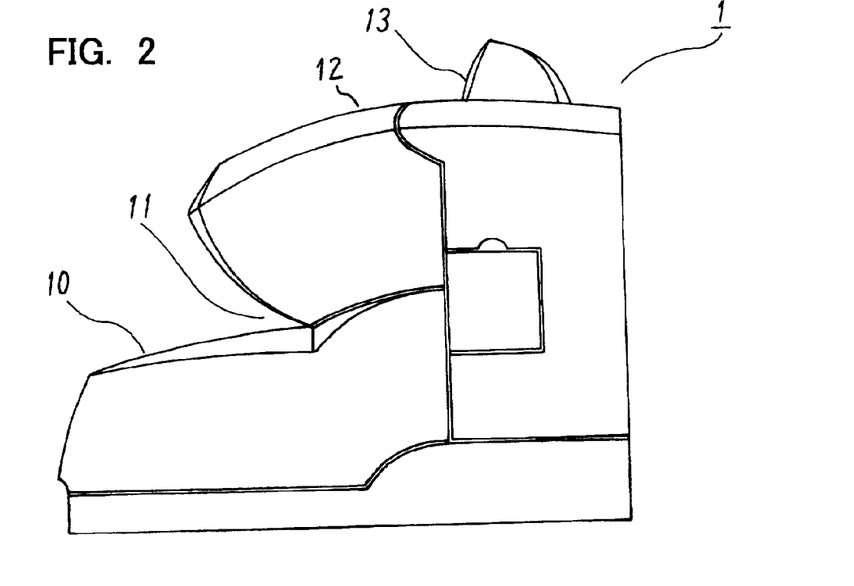
FIG. 2 is a side view of the image reader shown in FIG. 1.
Figure 3:
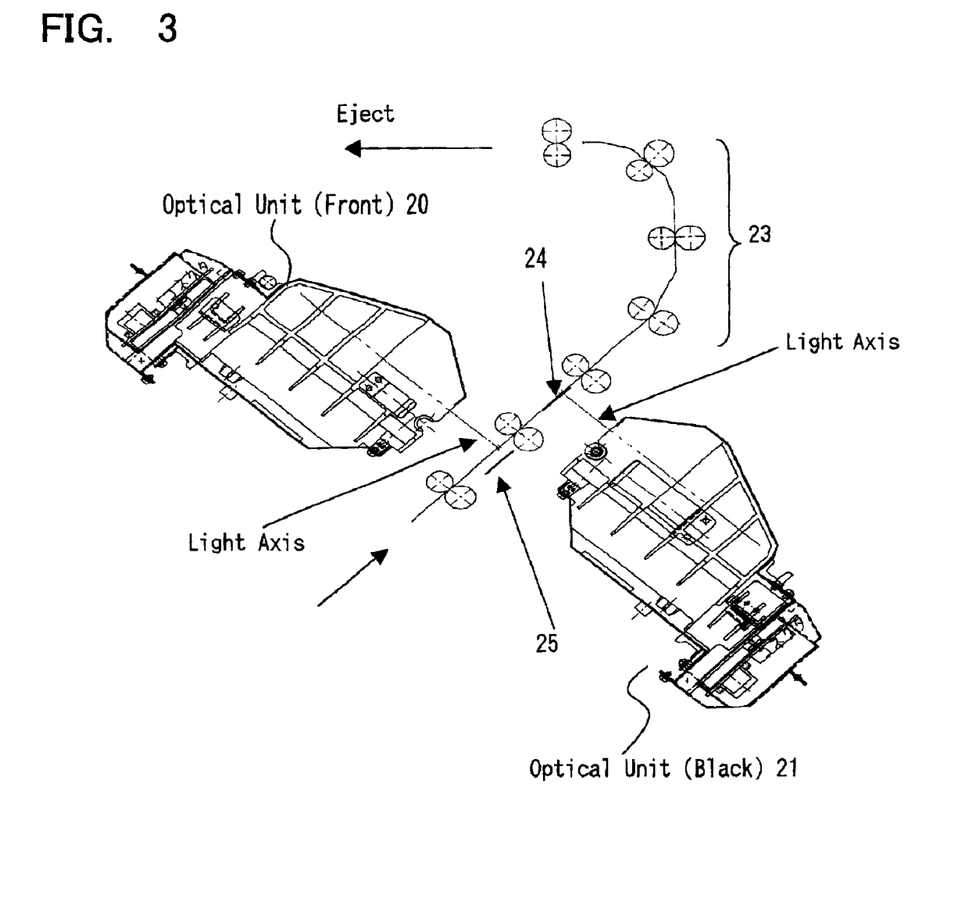
FIG. 3 is a cross-sectional view of the image reader shown in FIG. 2.

Image reading equipment of an embodiment according to the present invention is shown, taking an example of sheet-feed type image scanner. FIG. 1 is a front view of the image reading equipment. FIG. 2 is a side view of the image reading equipment. FIG. 3 is a cross-sectional view of a reading mechanism.

As shown in FIGS. 1 and 2, an image scanner 1 includes an entrance 10 for placing a document and the like, an inlet 11 for inserting the document, an outlet 13 for ejecting the document having been read, and a receiving portion 12 for receiving the ejected document. An operation panel 14 is provided in the front surface of image scanner 1.

As shown in FIG. 3, the reading mechanism includes; a sheet-feed mechanism 23 to transport a document inserted from inlet 11 continuously to outlet 13; an optical unit 20 to read an image on the front surface of the document being transported; another optical unit 21 to read an image of the back surface of the document being transported. On the opposite side of respective optical unit 20 and 21, backing members (liquid crystal members) 24 and 25 are provided respectively.

Optical units 20 and 21 are constituted by the known art including a mirror for producing an optical path length, a lens for focusing, and a photoelectric converter for converting reflected light to electric signal. The photoelectric converter consists of, for example, a CCD (charge coupled device). Backing members 24 and 25 consist of electro-optic elements as described later.

The operation of the reading mechanism is explained below: a document inserted from inlet 11 is transported continuously to outlet 13 by means of sheet-feed mechanism 23. Meanwhile, the optical unit 20 reads an image on the front surface of the document being transported and the optical unit 21 reads an image on the back surface of the document.

Above example shows a case of double-sided reading mechanism. Needless to say, a single-sided reading may also be possible.

[Reading Mechanism]

Figure 4:
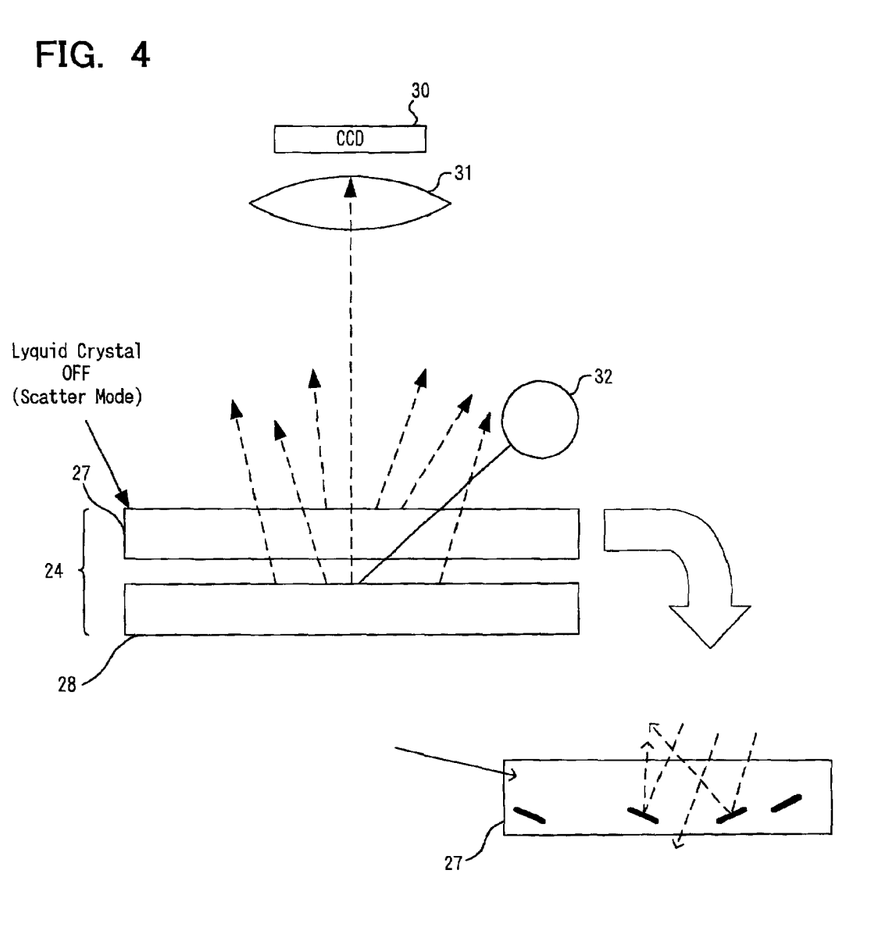
FIG. 4 is a configuration diagram of an optical reading mechanism of the image reader shown in FIG. 3.
Figure 5:
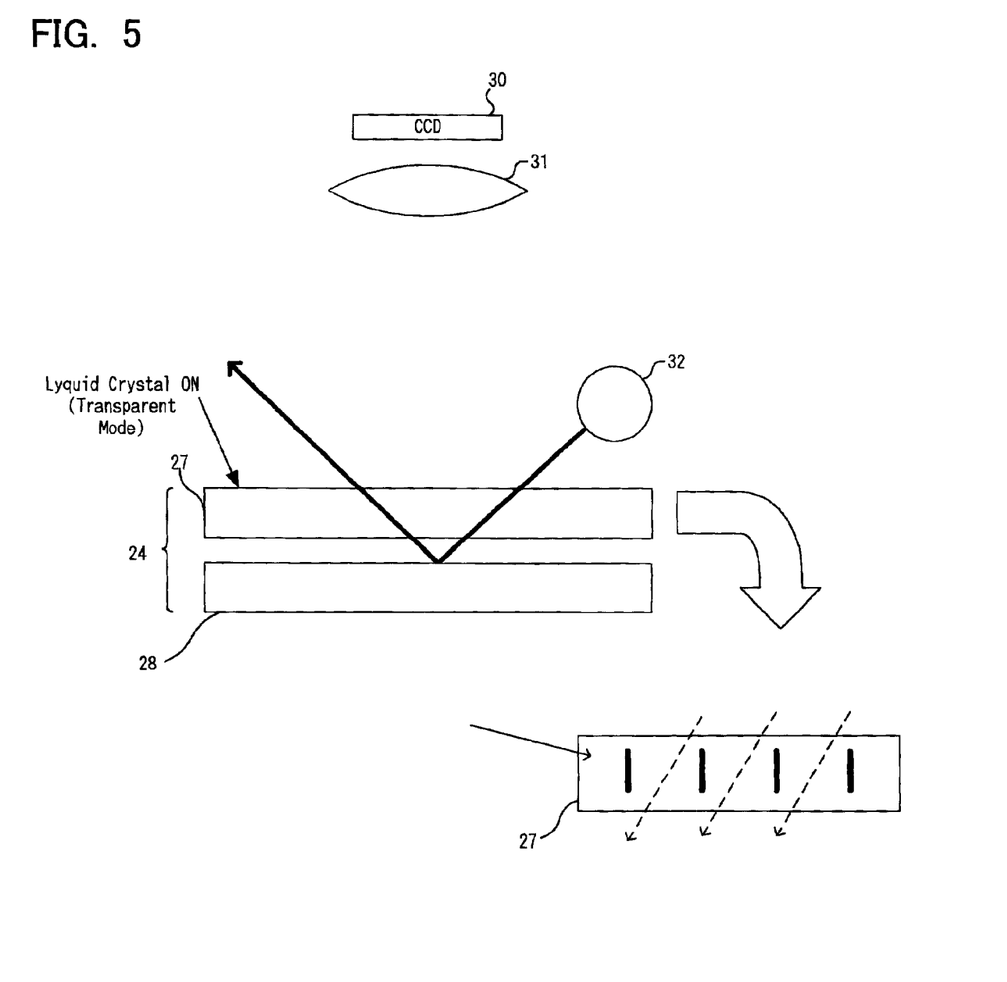
FIG. 5 is a diagram for illustrating the optical reading mechanism shown in FIG. 4.
Figure 6:
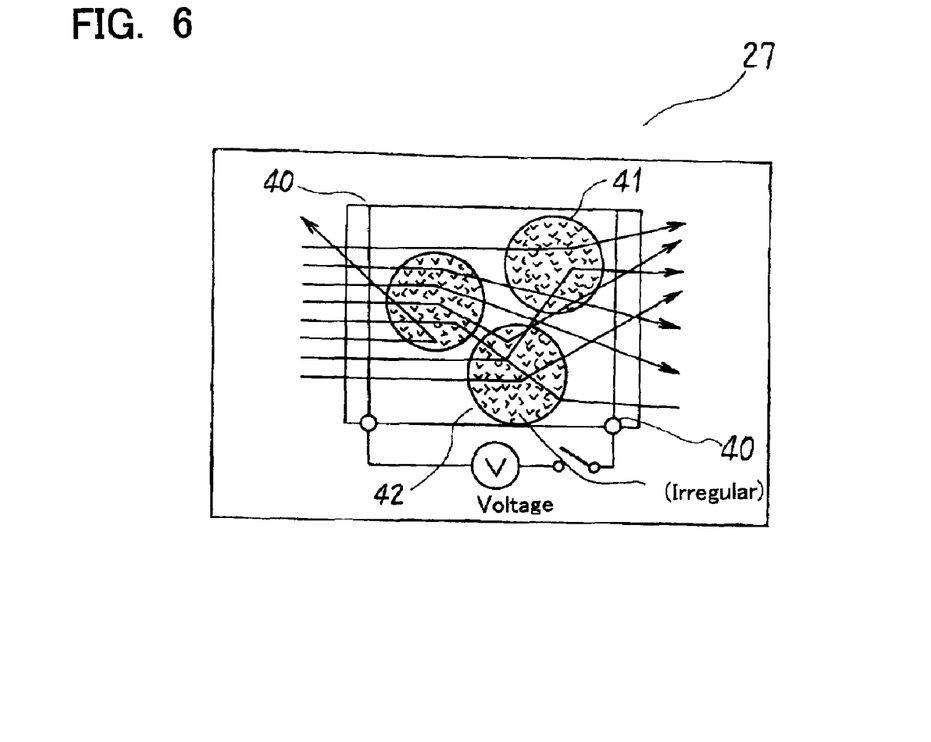
FIG. 6 is a configuration diagram of a liquid crystal film shown in FIG. 4.
Figure 7:
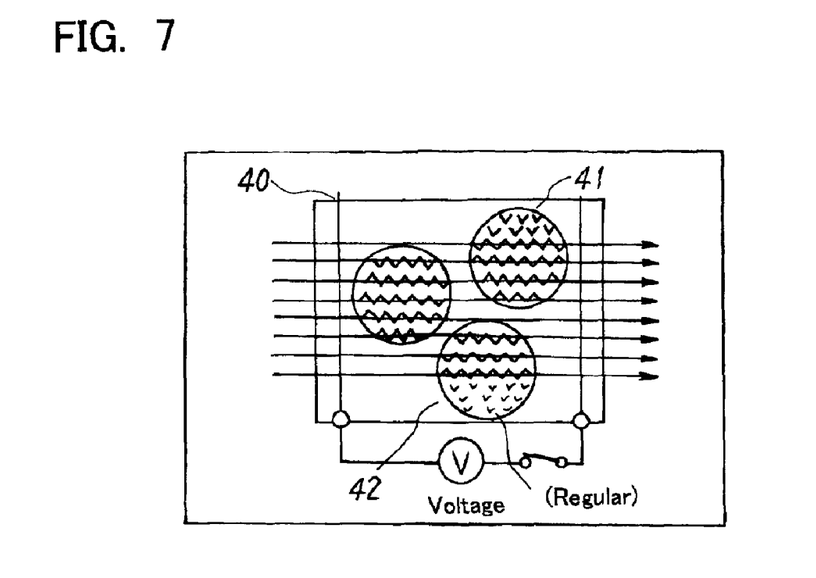
FIG. 7 is a diagram for illustrating the liquid crystal film shown in FIG. 6.

In FIGS. 4 and 5, configuration diagram of a reading mechanism are shown. In FIGS. 6 and 7 diagrams illustrating liquid crystal film are shown, and in FIG. 8 an operation diagram is shown.

As shown in FIG. 4, backing member 24 consists of a liquid crystal film 27 and a mirror (light reflecting member) 28. A lamp (illuminating member) 32 obliquely illuminates light to liquid crystal film 27. Lens 31 and CCD 30 of the optical unit 20 and 21 are provided respectively positioned opposite to liquid crystal film 27.

Liquid crystal film 27 has a variable transmittance depending on voltage applied thereto. As shown in FIG. 6 for example, liquid crystal film 27 includes a transparent polymer film 42 with scattered small particles (called capsules) 41 of nematic liquid crystal. Polymer film 42 is inserted between two sheets of polyester film each having a transparent conductive film 40.

The operation of liquid film 27 is illustrated below: When voltage is not applied to transparent conductive film 40, as shown in FIG. 6, liquid crystal molecules in capsule 41 are irregularly arrayed, causing incident light to be scattered. On the other hand, when voltage is applied to transparent conductive film 40, as shown in FIG. 7, liquid crystal molecules in capsule 41 are regularly arrayed, causing the incident light to be transmitted, not scattered.

Using the above characteristic of liquid crystal film 27, background color outside the document can be changed in the following manner: As shown in FIG. 4, liquid crystal film 27 and mirror 28 are positioned facing to an optical reading system (CCD 30 and lens 31). Light from a lamp 32 is irradiated obliquely. Here, liquid crystal film 27 and mirror 28 are provided at the backside of the document, viewed from the optical reading system, in the document reading position of the reading system.

As shown in FIG. 4, when voltage is not applied to liquid crystal film 27, irradiated light from lamp 32 is scattered at liquid crystal film 27 because liquid crystal film 27 scatters light in this situation. A part of light proceeds toward optical unit 21 (30, 31). Also, light once transmitted through liquid crystal film 27 reenters into liquid crystal film 27 by means of mirror 28, which is then scattered and a part of light proceeds toward optical unit 21.

Therefore, more than half of the irradiated light from lamp 32 reaches CCD 30 of optical unit 21, making background color white. Of course, actually document 91 is placed on liquid crystal film 27. However, in FIG. 4 there is shown an operation at the background where the document is not placed. In addition, document 91 is transported in horizontal direction in FIG. 4.

On the other hand, as shown in FIG. 5, when voltage is applied to liquid crystal film 27, irradiated light from lamp 32 is transmitted through liquid crystal film 27 because light is transmitted through liquid crystal film 27, as explained before. The light is then reflected by mirror 28 and reenters into liquid crystal film 27.

Most of the irradiated light from lamp 32 does not reach CCD 30 of optical unit 21, making background color black.

Also in this case, actually document 91 is placed on liquid crystal film 27. In FIG. 5, therefore, an operation at the background where the document is not placed is shown.

Figure 8A:
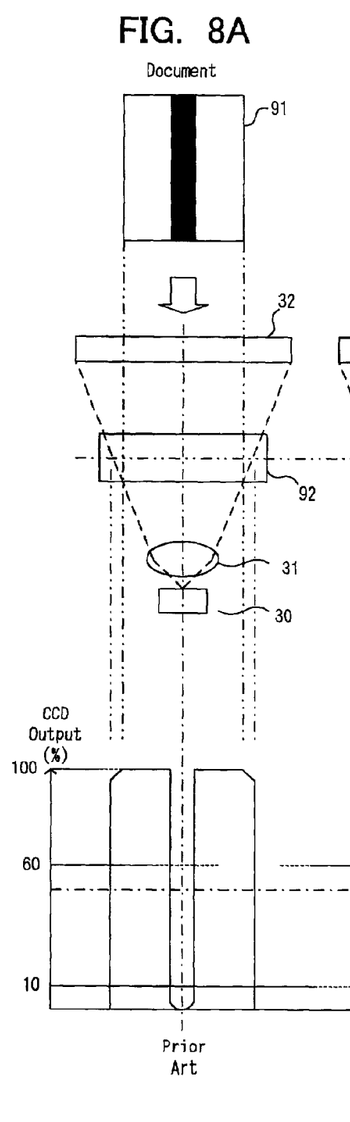
FIGS. 8A, 8B and 8C are operation diagrams of the optical reading mechanism shown in FIG. 4.
Figure 8B:
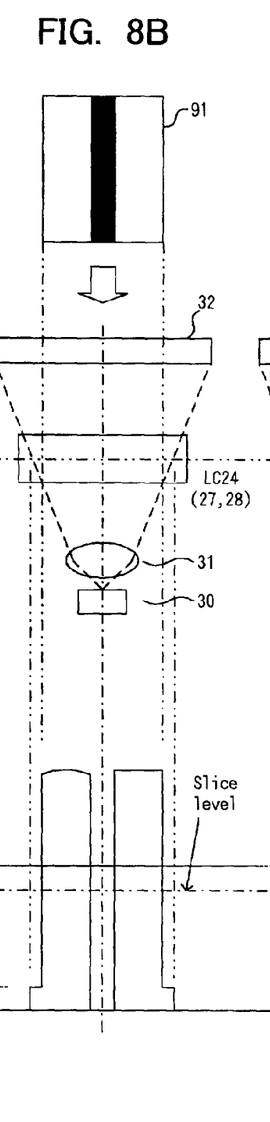
Figure 8C:
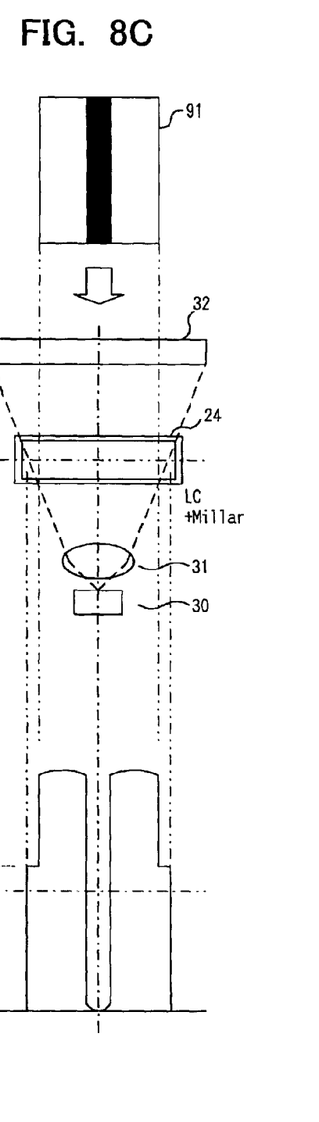

In FIG. 8A, 8B and 8C, operation diagrams according to the present invention are shown. In FIG. 8A, there is shown an output waveform of CCD 30 when document 91 shown in the figure passes through. Here, document 91 is placed on a conventional backing member 92 of which color is fixed (white). The output level of the background at both outer sides of document 91 is equal with the level of the texture inside document 91. The level corresponding to this background is not changeable.

On the other hand, as shown in FIG. 8C, when document 91 is passed through on backing member 24 while the voltage is not applied to liquid crystal film 27, irradiated light from lamp 32 is scattered at liquid crystal film 27 because liquid crystal film 27 scatters light as explained before, and a part of light proceeds toward optical unit 21 (30, 31). Also, light once transmitted through liquid crystal film 27 reenters into liquid crystal film 27 and is scattered. This causes a part of light to proceed toward optical unit 21. As shown in the figure of an output waveform of CCD 30, the level corresponding to the background outside document 91 reaches approximately 60% of the level of the texture inside document 91.

In the case shown in FIG. 8B, when document 91 is passed through on backing member 24 while the voltage is applied to liquid crystal film 27, irradiated light from lamp 32 is transmitted through liquid crystal film 27 because, in this case, liquid crystal film 27 transmits light as explained before. This results in the light not proceeding toward optical unit 21 (30, 31). As shown in the figure of an output waveform of CCD 30, the level corresponding to the background of both outer sides of document 91 is approximately 10% of the level of the texture inside document 91.

As a result, when a level for slicing is set between the two levels shown in FIGS. 8B and 8C to obtain binary output of CCD 30, a background color of either black in case of FIG. 8B or white in case of FIG. 8C can be obtained. Approximately 50% of the output level may preferably be assigned as the level for slicing, provided that the level of the texture in document 91 is 100%.

In the above description, mirror 28 is not essentially required because the present invention utilizes scattering or transmitting of light by means of liquid crystal film 27. The provision of mirror 28, however, facilitates the light transmitted through liquid crystal film 27 to direct toward the optical unit when voltage is not applied, as shown in FIG. 4 and FIG. 8C. Thus higher output level can be obtained for white background, producing greater level difference against the case of black background.

Also, mirror 28 enables to prevent incident light from entering from the back (which is opposite to the document loading plane) of liquid crystal film 27. In particular, the interference between the light irradiated to the surface and the back can be prevented in case of the double side reading mechanism shown in FIG. 3.

[Controller for Image Reader]

Figure 9:
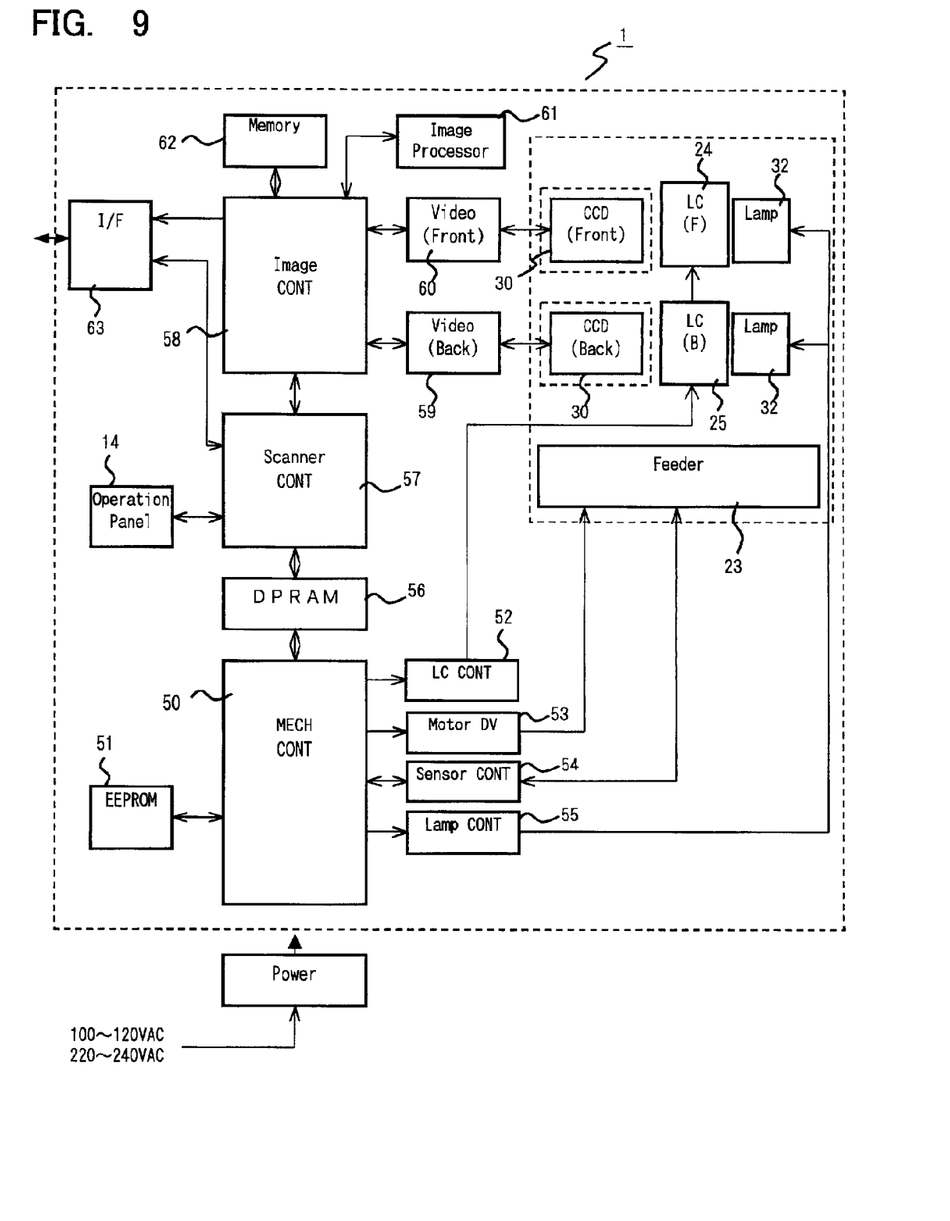
FIG. 9 is a block diagram of the image reader shown in FIG. 1.
Figure 10:
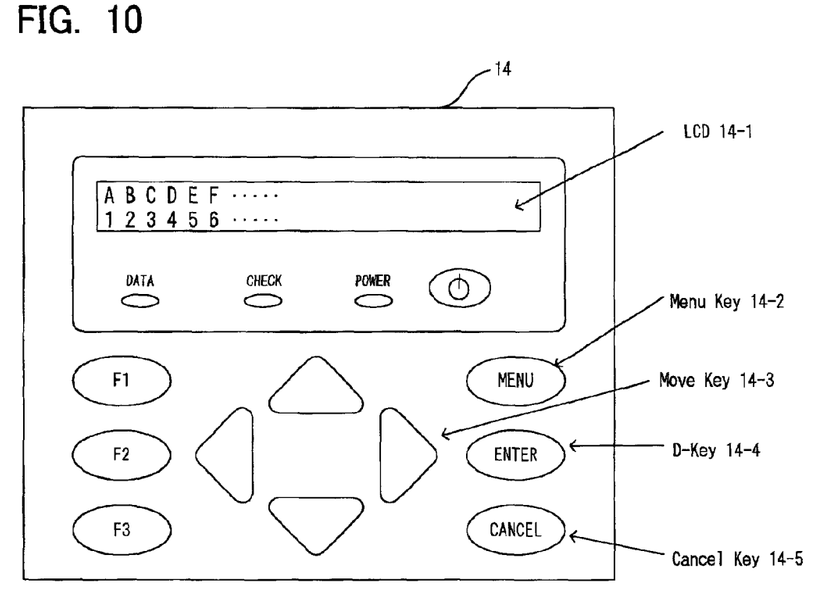
FIG. 10 is a diagram of an operation panel shown in FIG. 9.

In FIG. 9, there is shown a block diagram of the image reading equipment shown in FIG. 3. In FIG. 10, a configuration of an operation panel 14 is shown. In FIG. 9, like numerals or symbols refer to like parts in FIGS. 3 and 4. The image reading equipment is provided with three controllers: a mechanism controller 50, a scanner controller 57 and an image system controller 58. Each controller includes an MPU.

Mechanism controller 50 controls a mechanical portion based on a program stored in EPROM 51. Scanner controller 57 controls an entire scanner. Also, image system controller 58 controls an output of image signals. A liquid crystal controller 52 controls whether to apply voltages to liquid crystal film 24, 25 (27) or not to apply, in accordance with a command from the mechanism controller 50.

A motor driver 53 drives a conveying motor of a sheet feeder 23. A sensor controller 54 inputs and outputs signals of each sensor provided in sheet feeder 23. A lamp controller 54 controls a lamp (fluorescent lamp) 32 according to a command from mechanism controller 50.

Video circuits 59 and 60 respectively generate binary values from outputs of CCD 30 to convert into video signals. An image processing portion 61 processes images from video signals. A memory 62 temporarily stores video signals etc. An interface 63 transfers signals from/to a host. A DPRAM 56 acts as an intermediate memory for signal transfer between controllers 50 and 57.

As shown in FIG. 10, operation panel 14 is provided with a display portion 14-1, a menu key 14-2, moving keys 14-3, a determination key 14-4 and a cancel key 14-5. A menu (such as selection of white or black as the background) can be specified by menu key 14-2. Cursors etc. can be moved by moving keys 14-3. Determination key 14-4 is used for the determination of selection. In this example, a background color can be specified using operation panel 14.

Figure 11:
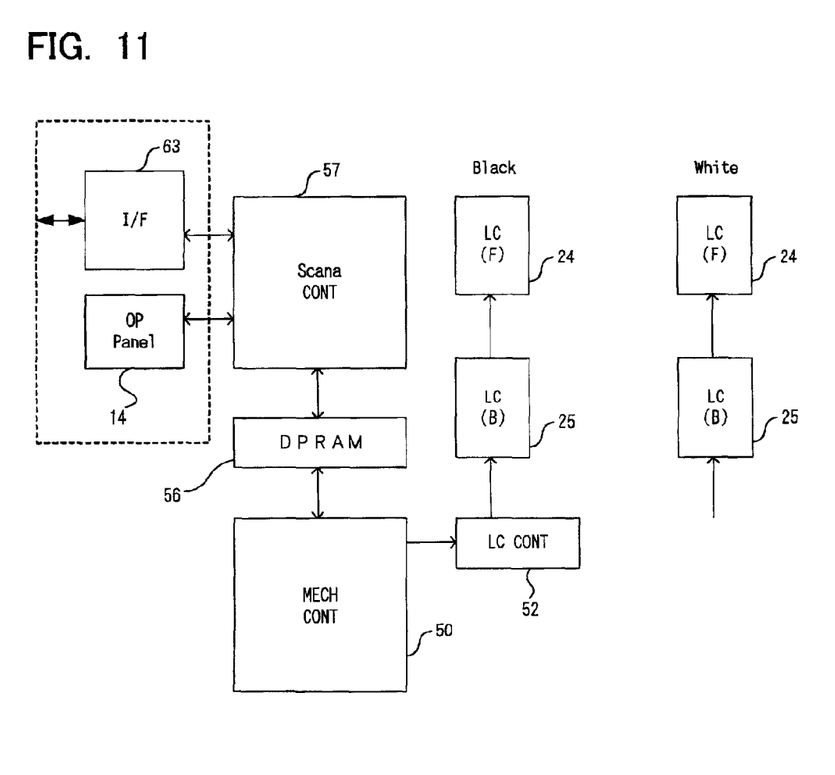
FIG. 11 is a diagram for illustrating an operation of changing background color in regard to FIG. 9.

In FIG. 11, there is shown an operation diagram for changing background color.

When a background color is specified using operation panel 14, scanner controller 57 receives this request, then indicates mechanism controller 50 to control liquid crystal via DPRAM 56. Mechanism controller 50 controls to apply voltage to liquid crystal films 24 and 25 through liquid crystal controller 52 according to the received indication related to background color. In the example shown above, liquid crystal controller 52 does not apply voltage to liquid crystal films 24 and 25 when white is specified as the background color. On the other hand, liquid crystal controller 52 applies voltage to liquid crystal films 24 and 25 when black is specified as the background color.

Also, by means of a command issued from a host via interface 63, scanner controller 57 and mechanism controller 50 control liquid crystal controller 52 for controlling to apply voltage according to the indication of background color. The host generates a command for specifying suitable background color depending on whether a current processing triggered by a program is OCR recognition processing or image processing. Thus depending on the processing triggered, background color can automatically be changed, and images having suitable background color for the processing can be transmitted to the host.

[Other Embodiments]

In addition to the aforementioned embodiment, the following modifications are possible.

(1) As a backing member which is electrically controllable, other electro-optic element than liquid crystal film may also be used, such as a liquid crystal panel etc.

(2) Although the above description is based on the sheet-feed type scanner, the invention is also applicable to a fixed-sheet type scanner.

Any other suitable modification may be possible, which are resorted to the scope of the invention. The foregoing description on the embodiments is not intended to limit the invention to the particular details of the examples illustrated.

The following effects can be attained by the present invention.

First, the backing member is configured by a member which electrically enables background color to be changeable, so that an image suitable for the successive processing can be output.

Secondly, as background color is changed electrically, background color can be changed even in case of image reading equipment having a fixed backing member.

Thirdly, background color can easily be changed by electric control means according to a successive processing of an obtained image.

All features and advantages of the invention which fall within the scope of the invention are covered by the appended claims.

What is claimed is:

1. An optical image reader for optically reading a document comprising:
    a light irradiating member for irradiating a light to said document;
    a reading means for reading a reflected light of said document; and
    a backing member provided at least in a reading position of said document and disposed on the opposite side to said reading means across said document, and for changing background colors of said document by electric control.

2. The optical image reader according to claim 1 wherein, said backing member comprises an electro-optic member having variable reflectivity by electric control.

3. The optical image reader according to claim 2 wherein said backing member comprising:
    a liquid crystal member having variable light transmittance by electric control; and
    a light reflective body.

4. The optical image reader according to claim 2, further comprising:
    controller for electrically controlling said light reflectivity of said electro-optic member according to a designation of said background color.

5. The optical image reader according to claim 4 wherein said controller electrically controls said light reflectivity of said electro-optic member depending on a program for processing said image having been read in.

6. The optical image reader according to claim 4, further comprising an operator panel for designating said background color to said controller.

7. The optical image reader according to claim 1, further comprising a document feeding means for feeding said document through said reading means and said backing member.

8. The optical image reader according to claim 7, wherein said reading means comprises;
    a first optical reader for optically reading a front surface of said document; and
    a second optical reader for optically reading a back surface of said document.

9. The optical image reader according to claim 8, wherein said backing means comprising:
    a first backing means provided for said first optical reader; and
    a second backing means provided for said second optical reader.

10. The optical image reader according to claim 1, wherein said reading means comprising a photo-electric converter and an optical element.

* * * * *